July 30, 1935.  M. TIBBETTS  2,009,533
MOTOR VEHICLE
Filed Sept. 23, 1933
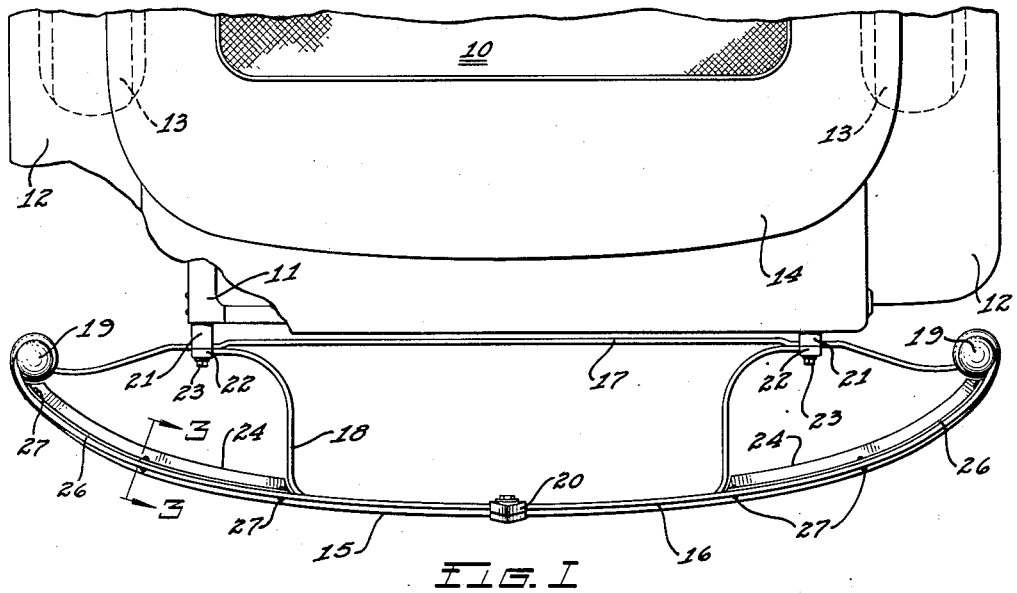
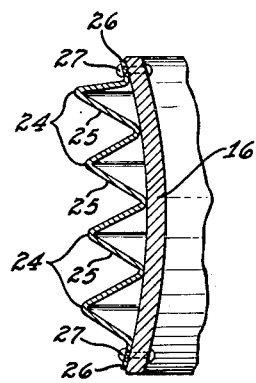
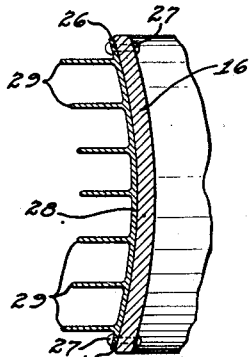
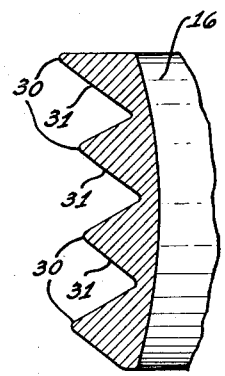
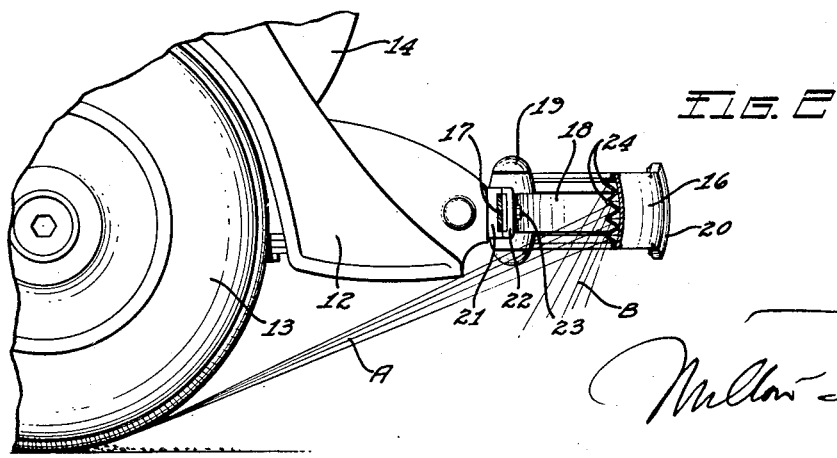
Inventor
Milton Tibbetts Patented July 30, 1935

2,009,533

UNITED STATES PATENT OFFICE 2,009,533

MOTOR VEHICLE

Milton Tibbetts, Detroit, Mich., assignor to Packard Motor Car Company, Detroit, Mich., a corporation of Michigan Application September 23, 1933, Serial No. 690,681

5 Claims. (Cl. 293—55)

This invention relates to motor vehicles and more particularly to stone deflectors employed for the protection of the finished surface of vehicles.

Certain parts of motor vehicles are arranged so that they extend in line with and behind the wheels. When the vehicle is traveling over a surface having loose material thereon, such as stones or gravel, the body finish is often checked and the body is sometimes dented by such material being thrown by the wheels and deflected by the parts of the vehicle in the path thereof.

An object of this invention is to provide a motor vehicle with means for deflecting stones thrown by the wheels so that they will not injure the exterior surface of the vehicle.

Another object of this invention is to provide a motor vehicle bumper impact bar with means for deflecting stones thrown thereagainst so that they will not strike the finished surface of the vehicle body.

Still another object of the invention is to provide a motor vehicle with stone deflecting means which is inconspicuous.

Other objects of the invention will appear from the following description taken in connection with the drawing, which forms a part of this specification, and in which:

Fig. 1 is a plan view of the rear portion of a motor vehicle having a bumper structure and deflector means incorporating the invention;

Fig. 2 is an elevational view of the same;

Fig. 3 is a vertical sectional view of the bumper and deflector taken on line 3—3 of Fig. 1;

Fig. 4 is a similar sectional view showing a modified form of deflector;

Fig. 5 is a similar sectional view showing still another form of deflector.

Referring now to the drawing by characters of reference, 10 indicates generally the rear end of a motor vehicle having a frame which includes side members as indicated at 11. Associated with the frame are the usual rear supporting wheels 13, wheel fenders 12 and a body 14.

In order to protect the rear end of the vehicle from damage in case of collision, I provide a bumper structure 15 which, for sake of illustration, is shown as the transversely extending type. This bumper comprises a transversely extending impact bar 16, a transversely extending base or support bar 17 and an intermediate spring brace bar 18. The impact bar and the base bar are substantially co-extensive and their adjacent ends are fastened together by bolts 19. A portion of the brace bar extends adjacent the central portion of the impact bar and is secured thereagainst by a clamp 20. The ends of the brace bar are bent to bear against the base bar and they are secured in a manner described hereinafter.

Fixed to the rear end of the frame side members are brackets 21 each having a groove in which the bumper base bar seats. Clamp members 22 extend around end portions of the brace bar and the portions of the base bar in the groove and are secured to the bracket by bolts 23. By means of this attachment, the impact bar extends transversely of the vehicle and is spaced rearwardly from the body and the fenders so that it is in line with the rear wheels.

Loose material on a road surface, such as stones and gravel, thrown by the wheels against parts of the vehicle in the path thereof will be deflected so that a portion thereof will strike against the body with sufficient force to check the finish and to dent the wall. This deflecting condition has heretofore been recognized and deflector plates have been associated with the portions of bumpers which lie in the path of movement of material thrown by the rear wheels. These deflectors have taken the form of flat sheets of metal applied horizontally to the end portions of the bumper structure and, while they are satisfactory, still they become dented and are objectionable because of their conspicuousness.

This invention has to do with an improved form of deflector means which is compact, efficient and arranged so that the casual observer will not notice it. To this end, I propose to provide an irregular surface which can be associated with the vehicle in the path of stones thrown by the wheels so that they will be deflected in a direction such that they will not strike the finished surface of the vehicle.

In the preferred form, as shown in Figs. 1 to 3 inclusive, the deflector means consists of a plate of sheet metal which is bent into corrugated form to provide a plurality of horizontally extending ribs 24. Such ribs provide angularly extending surfaces 25 which will intercept stones or gravel thrown by the wheels and will deflect them downwardly. This form of deflector is provided with top and bottom edge portions 26 which can be arranged to engage the upper and lower edges of the forward face of the impact bar and are secured thereto by rivets 27. There are preferably two similar deflectors employed which are of sufficient length to cover the areas along the impact bar in which stones are thrown by the wheels. The deflector structures engage against and have substantially the same vertical dimension as the adjacent portion of the impact bar and thus they are compact and inconspicuous. In Fig. 2, I have shown lines A indicating the path stones taken when thrown against the impact bar by the rear vehicle wheels, and lines B indicating the path stones take after striking the deflector.

In Fig. 4, I have illustrated another form which the deflector members may assume and, in this instance, I provide a pair of plates 28 which are substantially co-extensive with the forward face of the impact bar and of a similar vertical dimension. Extending forwardly from each plate 28, preferably in parallel vertical relation, I provide a plurality of ribs 29. Deflectors of this character are secured to the impact bar by rivets 26, in a similar manner as previously described. Stones thrown against this deflector will strike theforward face of the plate 28 or the under face of the ribs 29. In either instance, the ribs will deflect the stones downwardly so that they will not strike the vehicle body.

In Fig. 5, I have illustrated still another form of deflector means which may be employed. In this instance, instead of having the deflector members formed as separate structures, I propose to form the forward face of the bumper impact bar with a surface which produces the same results obtained with the previously described ribbed embodiments of the invention. The portions of the impact bar in line with the rear wheels of the vehicle are formed with ribs 30 which extend transversely of the vehicle. Such ribs provide surfaces 31 which extend at an angle and serve to deflect stones striking thereagainst in a downward direction. It will be noticed that in this instance the deflector portions of the impact bar must necessarily be formed of a greater thickness than is required in the impact bars to which the previously described deflectors are attached.

The various embodiments of the invention which I have illustrated provide irregular surfaces which are associated with the vehicle to efficiently deflect stones striking thereagainst so that they will be directed away from the exterior surface of the vehicle body. Such deflecting means is compact and inconspicuous.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. A bumper for motor vehicles comprising an impact bar adapted to be arranged crosswise of the vehicle and having a vertical portion in line with the rear wheels, and means forming the vertical forward face of that part of the impact bar in line with the wheels comprising a ribbed surface including a plurality of relatively small ribs of such depth and so spaced that stones directed from the wheels toward any part of the impact bar in line with the wheels will be deflected toward the road surface.

2. A bumper for motor vehicles comprising an impact bar adapted to be arranged crosswise of the vehicle and partly in line with the rear wheels, and a vertically extending corrugated plate secured to the forward face of the bar in line with the wheels, there being a plurality of small corrugations with angular faces forming ribs extending lengthwise of the bar for deflecting stones thrown from the wheels.

3. In a motor vehicle, a deflector plate comprising a plurality of relatively small vertically spaced ribs of a depth corresponding substantially to their spacing, said ribs extending transversely of the vehicle in the path of stones thrown by the vehicle wheels to thereby deflect the stones toward the road surface, and means for supporting said plate to protect the vehicle parts.

4. A bumper for motor vehicles comprising an impact bar adapted to be arranged crosswise of the vehicle and partly in line with the rear wheels, the entire forward face of said bar in line with the wheels being formed by a plurality of relatively small parallel spaced ribs of such depth and so spaced vertically that stones directed from the wheels toward any part of the impact bar in line with the wheels will be deflected toward the road surface.

5. A bumper for motor vehicles comprising an impact bar adapted to be arranged crosswise of the vehicle and partly in line with the rear wheels, and a plate secured to the forward face of the bar in line with the wheels and formed with a plurality of small ribs extending lengthwise of the bar of such depth and so spaced vertically that stones directed from the wheels toward any part of the impact bar in line with the wheels will be deflected toward the road surface.

MILTON TIBBETTS.